United States Patent
Kadowaki et al.

(10) Patent No.: US 11,063,542 B2
(45) Date of Patent: Jul. 13, 2021

(54) MOTOR DRIVE APPARATUS AND ELECTRIC POWER STEERING APPARATUS

(71) Applicant: Nidec Corporation, Kyoto (JP)

(72) Inventors: Tsuyoshi Kadowaki, Kyoto (JP); Hiroki Fujiwara, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 16/607,730

(22) PCT Filed: Apr. 9, 2018

(86) PCT No.: PCT/JP2018/014878
§ 371 (c)(1),
(2) Date: Oct. 24, 2019

(87) PCT Pub. No.: WO2018/198739
PCT Pub. Date: Nov. 1, 2018

(65) Prior Publication Data
US 2020/0059186 A1    Feb. 20, 2020

(30) Foreign Application Priority Data

Apr. 28, 2017 (JP) .............................. JP2017-089634

(51) Int. Cl.
*H02P 27/08* (2006.01)
*H02P 23/14* (2006.01)
(Continued)

(52) U.S. Cl.
CPC .............. *H02P 23/14* (2013.01); *H02P 27/06* (2013.01); *H02P 29/40* (2016.02); *H02P 29/60* (2016.02)

(58) Field of Classification Search
CPC .......... H02P 23/14; H02P 29/40; H02P 29/60; H02P 27/06; H02P 25/22; H02P 29/68; H02P 29/032
See application file for complete search history.

(56) References Cited

U.S. PATENT DOCUMENTS 8,253,362 B2 *   8/2012   Sakamoto ............ B62D 5/0496
                                                           318/434
2004/0026161 A1 *   2/2004   Takatsuka ............ B62D 5/0496
                                                           180/446
(Continued)

FOREIGN PATENT DOCUMENTS

JP   2004-048983 A   2/2004
JP   2016-174510 A   9/2016

OTHER PUBLICATIONS

Official Communication issued in International Patent Application No. PCT/JP2018/014878, dated Jun. 19, 2018.

*Primary Examiner* — Muhammad S Islam

(74) *Attorney, Agent, or Firm* — Keating & Bennett

(57) ABSTRACT

A motor driving apparatus that drives a motor includes a controller that outputs a driving signal indicating a driving amount of the motor, a driver including a plurality of inverter circuits, each of which supplies an electric current supplied from an external power supply to the motor based on the driving signal outputted from the controller, and first temperature sensors, each of which measures a temperature of a separate one of the plurality of inverter circuits. A first temperature difference is defined as the temperature of one of the inverter circuits minus the temperature of a remaining one of the inverter circuits. The controller, when the first temperature difference is equal to or greater than a predetermined difference value at a specific time point, outputs a driving signal indicating a second driving amount smaller than a first driving amount to the one of the inverter circuits.

13 Claims, 6 Drawing Sheets

(51) Int. Cl.
*H02P 29/40* (2016.01)
*H02P 29/60* (2016.01)
*H02P 27/06* (2006.01)

(56) References Cited

U.S. PATENT DOCUMENTS

| | | | |
|---|---|---|---|
| 2005/0257986 A1* | 11/2005 | Kagei | B62D 5/0496 180/404 |
| 2011/0178681 A1* | 7/2011 | Gu | B62D 5/0496 701/42 |
| 2015/0084570 A1* | 3/2015 | Hara | H02P 21/22 318/494 |

* cited by examiner

MOTOR DRIVE APPARATUS AND ELECTRIC POWER STEERING APPARATUS

CROSS REFERENCE TO RELATED APPLICATIONS

This is a U.S. national stage of PCT Application No. PCT/JP2018/014878, filed on Apr. 9, 2018, and priority under 35 U.S.C. § 119(a) and 35 U.S.C. § 365(b) is claimed from Japanese Application No. 2017-089634, filed Apr. 28, 2017; the entire contents of which are hereby incorporated herein by reference.

FIELD OF THE INVENTION

The present disclosure relates to a motor driving apparatus and an electric power steering apparatus.

BACKGROUND

Driving of a motor for use in an electric power steering apparatus or the like is controlled by a motor driving apparatus including an inverter circuit arranged to supply an electric current to the motor. Electronic components included in the inverter circuit may be damaged due to generation or heat that accompanies the control of motor driving. A malfunction of the inverter circuit caused by damage to any electronic component would impair performance of the electric power steering apparatus.

A known overheat protection apparatus is arranged to prevent overheating of a motor and a motor peripheral device by calculating estimated values of temperatures of the motor and a controller, and controlling supply of an electric current to the motor based on the estimated values.

When one of a plurality of inverter circuits included in a motor driving apparatus has broken down, a known technique stops an operation of the inverter circuit that has broken down and causes a remaining one of the inverter circuits to operate to continue the control of motor driving.

An extended life of the motor driving apparatus can be achieved if, before an overheated inverter circuit breaks down, an inverter circuit that is not overheated can be utilized in place of the overheated inverter circuit for the control of motor driving. In the aforementioned known overheat protection apparatus, which is arranged to prevent overheating on the basis of the amount of heat generation of the whole motor driving apparatus, it may be difficult to prevent overheating of each individual inverter circuit.

SUMMARY

A motor driving apparatus according to an example embodiment of the present disclosure includes a controller that outputs a driving signal indicating a driving amount of the motor, a driver including a plurality of inverter circuits each of which supplies an electric current supplied from an external power supply to the motor based on the driving signal outputted from the controller, and first temperature sensors each of which measures a temperature of a separate one of the plurality of inverter circuits. A first temperature difference is defined as the temperature of one of the inverter circuits minus the temperature of a remaining one of the inverter circuits, when the first temperature difference is equal to or greater than a predetermined difference value at a specific time point, outputs a driving signal indicating a second driving amount smaller than a first driving amount to the one of the inverter circuits, the first driving amount being a driving amount at the specific time point.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the accompanying drawings and so on. Note that the scope of the present disclosure is not limited to the example embodiments described below, but includes any modification thereof within the scope of the technical idea of the present disclosure.

Figure 1:
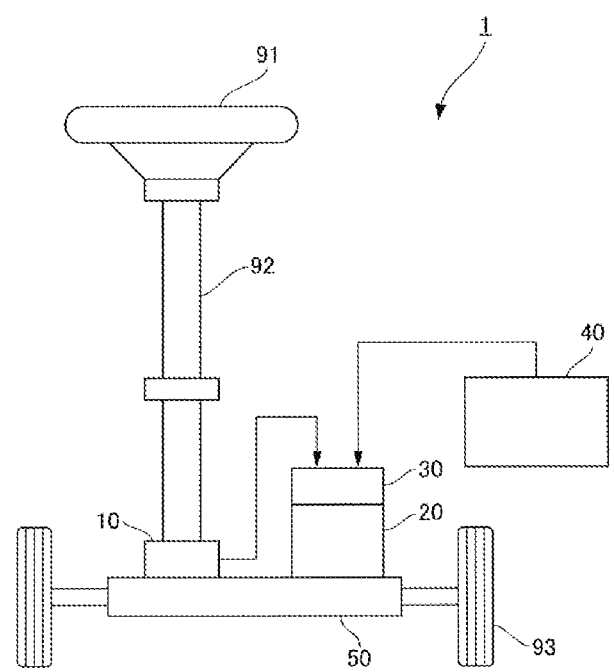
FIG. 1 is a schematic diagram of an electric power steering apparatus including a motor driving apparatus according to an example embodiment of the present disclosure.

FIG. 1 is a schematic diagram of an electric power steering apparatus 1 including a motor driving apparatus 30 according to an example embodiment of the present disclosure. The electric power steering apparatus 1 is an apparatus to assist a driver in operating a steering wheel in transportation equipment, such as, for example, an automobile. As illustrated in FIG. 1, the electric power steering apparatus 1 according to the present example embodiment includes a torque sensor 10, a motor 20, and the motor driving apparatus 30. In the present example embodiment, the motor 20 and the motor driving apparatus 30 are contained in a common casing. A reduced size of the electric power steering apparatus 1 can be achieved by, for example, configuring the motor 20 in a so-called mechatronics form.

The torque sensor 10 is attached to a steering shaft 92. Once the driver operates a steering wheel 91 to rotate the steering shaft 92, the torque sensor 10 measures a torque applied to the steering shaft 92. A torque signal, which is a measurement signal obtained by the torque sensor 10, is outputted from the torque sensor 10 to the motor driving apparatus 30. The motor driving apparatus 30 drives the motor 20 on the basis of the torque signal inputted from the torque sensor 10. Note that the motor driving apparatus 30 may refer to not only the torque signal, but also other information (e.g., a vehicle speed, etc.) as well.

In the present example embodiment, a three-phase synchronous brushless motor is used as the motor 20. The motor 20 includes coils for three phases, a U phase, a V phase, and a W phase. When the motor 20 is driven, an electric current is supplied from the motor driving apparatus 30 to each of the U phase, the V phase, and the W phase in the motor 20. Once the electric currents are supplied, a rotating magnetic field is generated between a rotor including a magnet and a stator including the coils for the three phases, the U phase, the V phase, and the W phase. As a result, the rotor is caused to rotate with respect to the stator of the motor 20.

The motor driving apparatus 30 supplies electric drive currents to the motor 20 using power obtained from an external power supply 40. A driving force produced from the motor 20 is transmitted to wheels 93 through a gearbox 50. As a result, the steering angle of the wheels 93 is changed. As described above, the electric power steering apparatus 1 amplifies the torque of the steering shaft 92 with the motor 20 to change the steering angle of the wheels 93. Accordingly, the driver is enabled to operate the steering wheel 91 with a smaller force.

Figure 2:
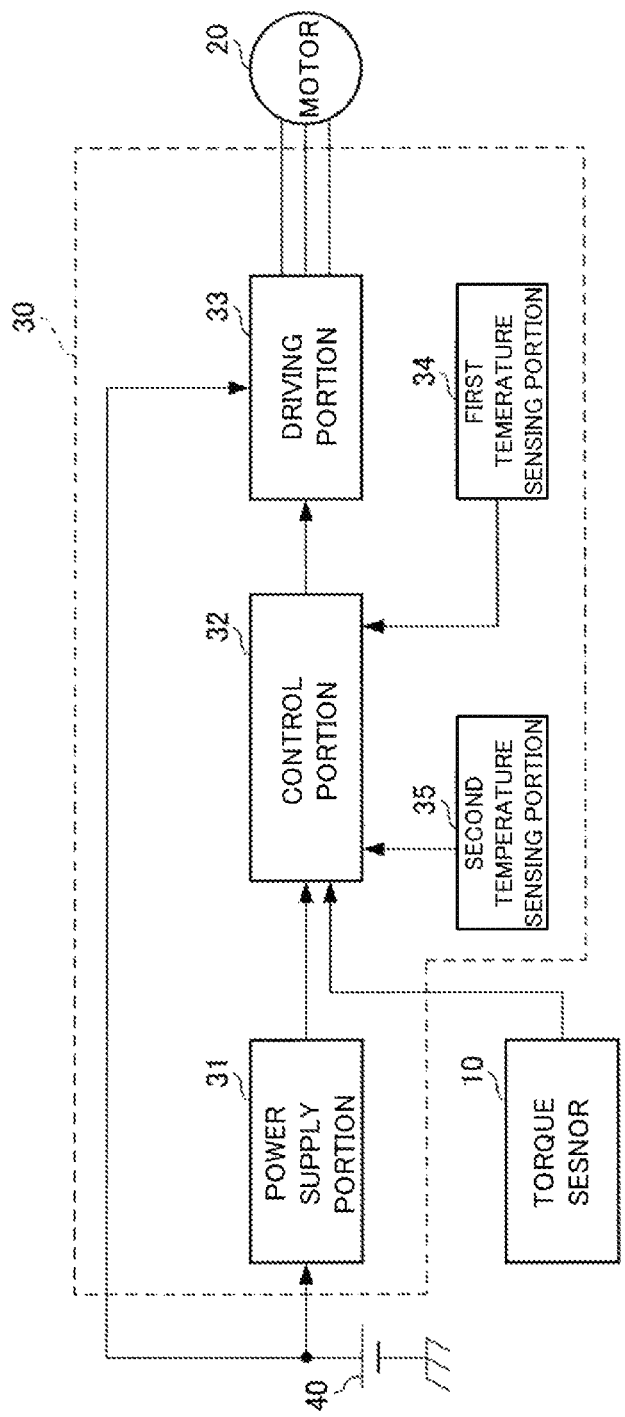
FIG. 2 is a block diagram illustrating the configuration of a motor driving apparatus according to an example embodiment of the present disclosure.

FIG. 2 is a block diagram illustrating the configuration of the motor driving apparatus 30. As illustrated in FIG. 2, the motor driving apparatus 30 is electrically connected to each of the torque sensor 10, the motor 20, and the external power supply 40. The motor driving apparatus 30 includes a control unit including a power supply portion 31, a controller 32, a driver 33, first temperature sensors 34, and a second temperature sensing portion 35.

The power supply portion 31 supplies power from the external power supply 40 to the controller 32. Meanwhile, power is supplied from the external power supply 40 to the driver 33 without passing through the power supply portion 31.

The controller 32 receives the torque signal outputted from the torque sensor 10. A computer including a processing portion, such as a CPU, a memory, such as a RAM, and a storage portion, such as a hard disk drive, for example, is used as the controller 32. Note, however, that an electrical circuit including a computing device, such as, for example, a microcontroller, may alternatively be used instead of the computer. The controller 32 performs control to prevent overheating of inverter circuits included in the driver 33 using measuring results obtained by the first temperature sensors 34 and so on. Specific functions of the controller 32 will be described below.

The driver 33 includes a plurality of inverter circuits and an inverter driver, and supplies electric currents to the motor 20. Each inverter circuit includes, for example, transistors, such as metal-oxide-semiconductor field-effect transistors (MOSFETs), as switching elements. In the present example embodiment, a three-phase synchronous brushless motor is used as the motor 20, and therefore, each of the plurality of inverter circuits includes three pairs of switching elements connected in parallel.

Note that the motor driving apparatus 30 may drive either only the single motor 20 or a plurality of motors 20. Also note that the driver 33 may either cause all of the plurality of inverter circuits to operate to drive the motor 20, or cause only some of the plurality of inverter circuits to operate to drive the motor 20. In the present example embodiment, the driver 33 used includes two inverter circuits.

The inverter driver is an electrical circuit to operate each inverter circuit. In the present example embodiment, the inverter driver supplies, to the switching elements included in the inverter circuit, a PWM driving signal indicating a driving amount of the motor 20 in accordance with a pulse width modulation scheme (PWM scheme) and outputted from the controller 32. The inverter circuit supplies an electric current to each of the U phase, the V phase, and the W phase of the motor 20 on the basis of the PWM driving signal supplied from the inverter driver.

The driver 33 is arranged on a board. The plurality of inverter circuits are arranged to have point symmetry with respect to a center of a surface of the board on which the driver 33 is arranged. Details thereof will be described below with reference to FIGS. 3A and 3B. The above arrangement helps to reduce a difference in the calculated amount of heat radiation between the plurality of inverter circuits, and leads to stable calculation of the amounts of heat radiation. That is, an improvement in the accuracy with which an inverter circuit excessively heated to a high temperature is identified can be achieved.

Each of the first temperature sensors 34 measures the temperature of a separate one of the plurality of inverter circuits of the driver 33, and outputs the measured temperature to the controller 32. Each of the first temperature sensors 34 is provided for a separate one of the plurality of inverter circuits. The first temperature sensing portion 34 is preferably arranged in the vicinity of a position where heat-radiating components of the corresponding inverter circuit are concentrated, for example, in the vicinity of a center of the circuit. Details thereof will be described below with reference to FIGS. 3A, 3B, 5A, and 5B. Here, the heat-radiating components are mainly the MOSFETs used as the switching elements.

The second temperature sensing portion 35 measures the temperature of the controller 32, and outputs the measured temperature to the controller 32. The second temperature sensing portion 35 is arranged singly at a position equidistant from the first temperature sensors 34. Details thereof will be described below with reference to FIGS. 4A, 4B, 5A, and 5B.

As each of the first temperature sensors 34 and the second temperature sensing portion 35, a thermistor arranged to change in resistance value in accordance with the temperature to be measured may be used from the standpoint of flexibility in sensitivity, size, and precision. Further, an angle sensor arranged to measure the rotational position of the rotor of the motor 20 may be arranged to function also as the second temperature sensing portion 35. This arrangement will provide advantages to the motor driving apparatus 30 in terms of apparatus cost and size.

Figure 3A:
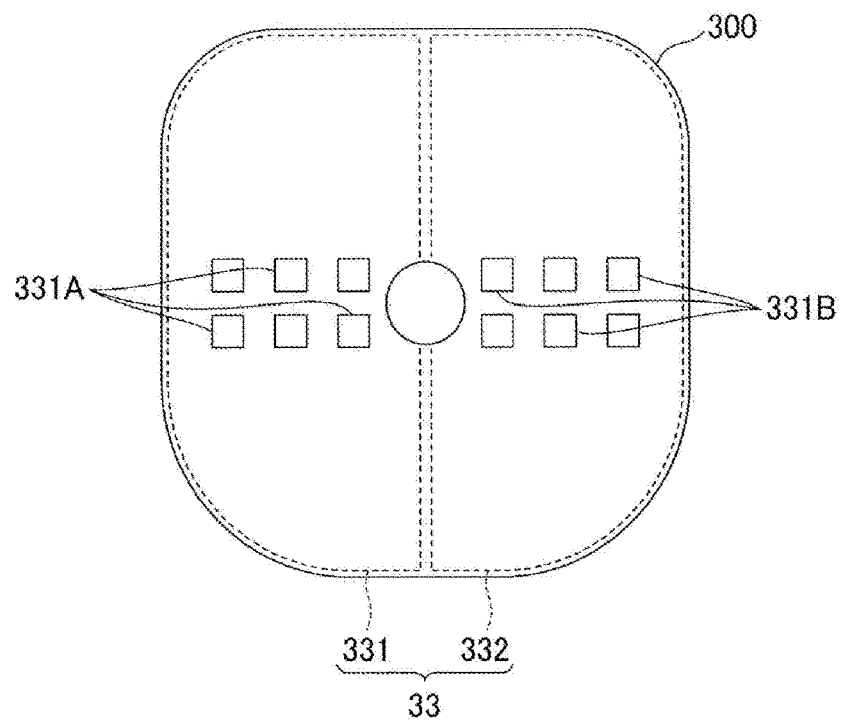
FIG. 3A is a diagram illustrating an arrangement of first temperature sensors in the case where a controller and a driver are on separate boards according to an example embodiment of the present disclosure.
Figure 3B:
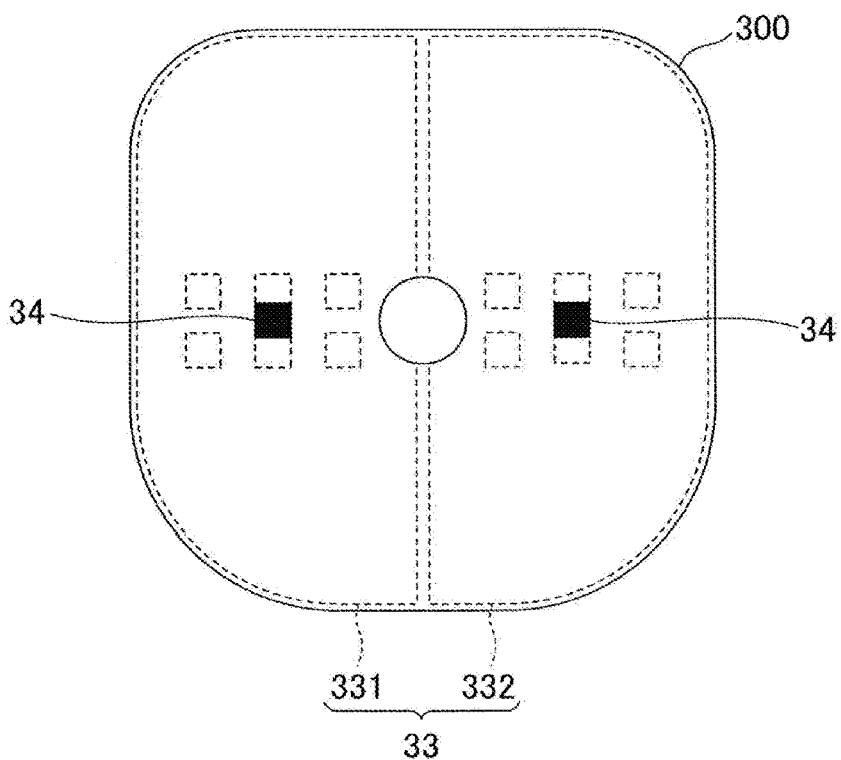
FIG. 3B is a diagram illustrating the arrangement of the first temperature sensors in the case where the controller and the driver are on separate boards according to an example embodiment of the present disclosure.

FIGS. 3A and 3B are diagrams illustrating an arrangement of the first temperature sensors 34 in the case where the controller 32 and the driver 33 are formed on separate boards. Of the components of the control unit, the driver 33 is a primary heat source, and therefore, forming the controller 32 and the driver 33 on separate boards may contribute to limiting accumulation of heat in the control unit.

FIG. 3A is a diagram illustrating a driver board 300 with elements of the driver 33 arranged thereon as viewed from the side of a surface on which the elements are arranged, while FIG. 3B is a diagram illustrating the driver board 300 as viewed from the side of a surface opposite to the surface on which the elements are arranged. In connection with FIGS. 3A, 3B, 4A, 4B, 5A, and 5B, of surfaces of boards which are opposite to each other, one surface on which the elements are arranged is hereinafter referred to as an element surface, and the other surface on which the temperature sensing portion(s) is arranged is hereinafter referred to as a sensor surface.

In FIGS. 3A and 3B, the switching elements (i.e., the MOSFETs) of the inverter circuits and the first temperature sensors 34 are depicted for the sake of simplicity in description. The driver 33 includes a first inverter circuit 331 and a second inverter circuit 332. As illustrated in FIGS. 3A and 3B, the first inverter circuit 331 and the second inverter circuit 332 are arranged to have point symmetry with respect to a center of the driver board 300, for example.

As illustrated in FIGS. 3A and 3B, the first inverter circuit 331 and the second inverter circuit 332 include six switching elements 331A and six switching elements 331B, respectively. As illustrated in FIG. 3B, for each inverter circuit, the first temperature sensing portion 34 is arranged on the sensor surface at a position opposite to a center of a region in which the switching elements (MOSFETs) 331A or 331B are arranged.

Figure 4A:
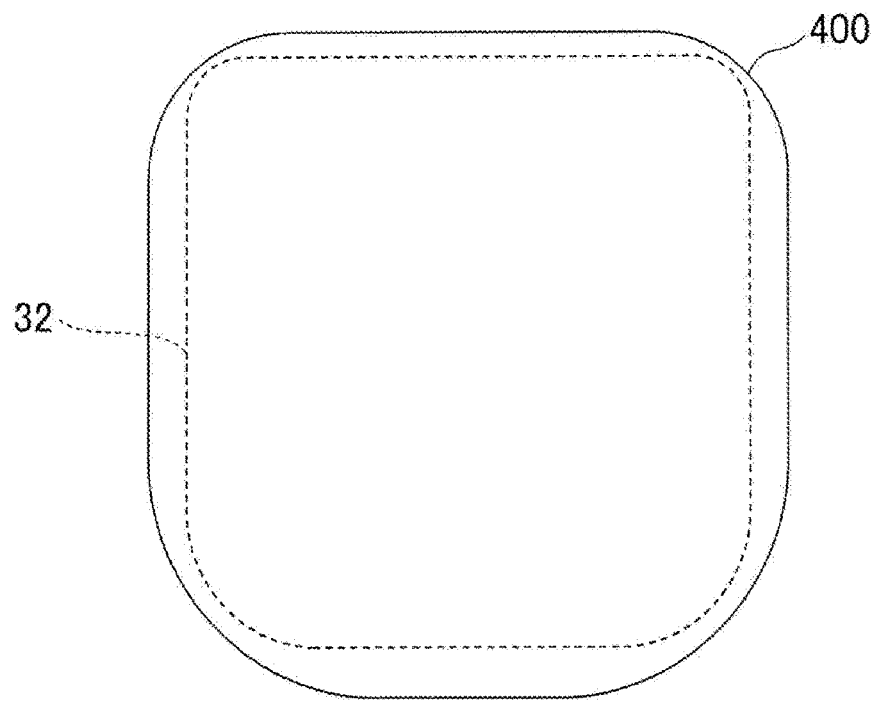
FIG. 4A is a diagram illustrating an arrangement of a second temperature sensing portion in the case where the controller and the driver are on separate boards according to an example embodiment of the present disclosure.
Figure 4B:
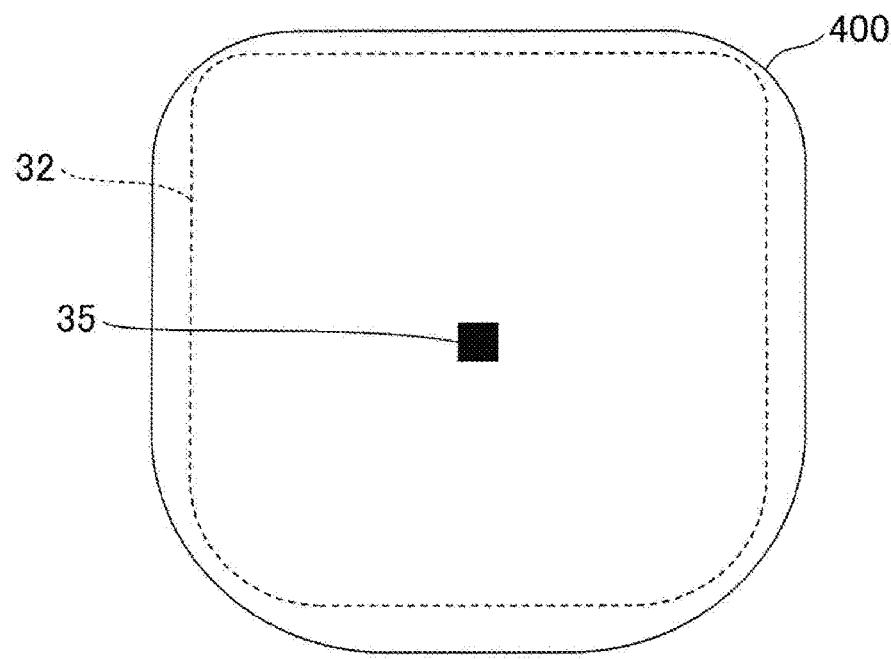
FIG. 4B is a diagram illustrating the arrangement of the second temperature sensing portion in the case where the controller and the driver are on separate boards according to an example embodiment of the present disclosure.

FIGS. 4A and 4B are diagrams illustrating an arrangement of the second temperature sensing portion 35 in the case where the controller 32 and the driver 33 are formed on separate boards. Only the second temperature sensing portion 35 is depicted for the sake of simplicity in description. FIG. 4A is a diagram illustrating a controller board 400 as viewed from the side of the element surface, while FIG. 4B is a diagram illustrating the controller board 400 as viewed from the side of the sensor surface.

The driver board 300 and the controller board 400 are arranged to have the element surfaces thereof facing each other. The second temperature sensing portion 35 is arranged on a surface of the controller board 400 at a position equidistant from the plurality of first temperature sensors 34 arranged on the driver board 300. Arranging the first temperature sensors 34 and the second temperature sensing portion 35 in the above positional relationship helps to reduce the difference in the calculated amount of heat radiation between the plurality of inverter circuits, and leads to stable calculation of the amounts of heat radiation.

Figure 5A:
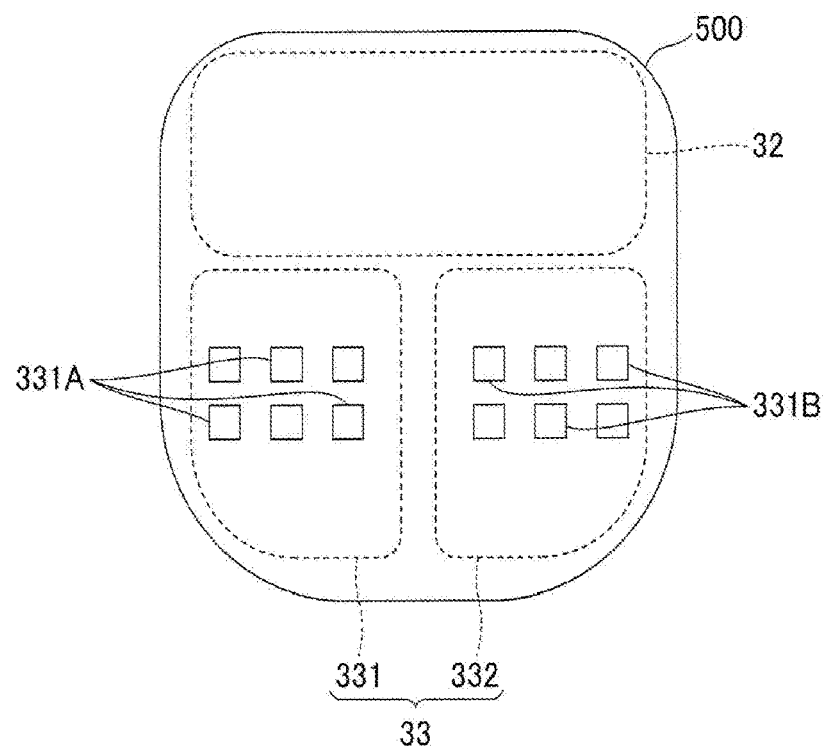
FIG. 5A is a diagram illustrating an arrangement of the temperature sensors in the case where the controller and the driver are on a single board according to an example embodiment of the present disclosure.
Figure 5B:
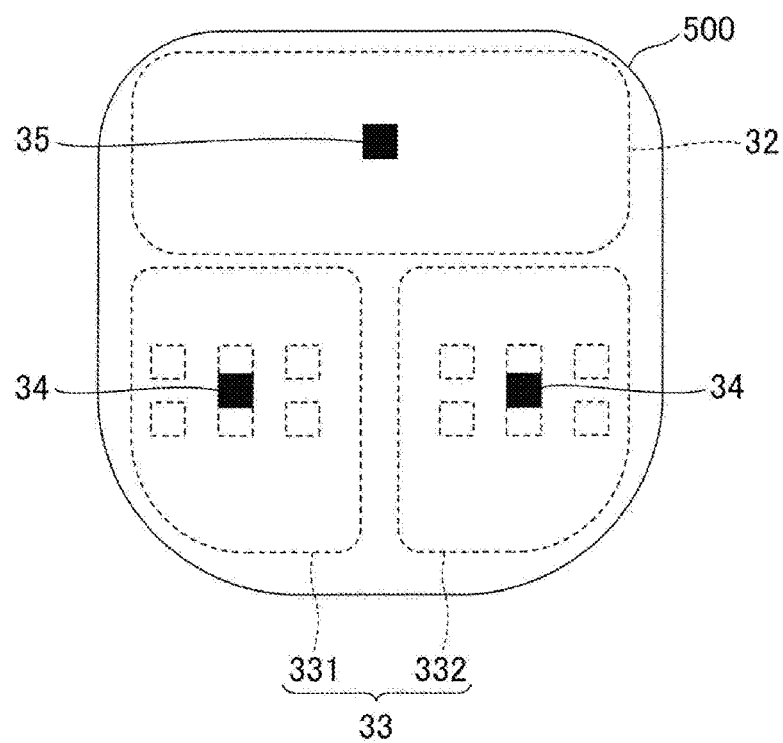
FIG. 5B is a diagram illustrating the arrangement of the temperature sensors in the case where the controller and the driver are on a single board according to an example embodiment of the present disclosure.

FIGS. 5A and 5B are diagrams illustrating an arrangement of the first temperature sensors 34 in the case where the controller 32 and the driver 33 are formed on a single board. FIG. 5A is a diagram illustrating a board 500 with the elements of the driver 33 and the controller 32 arranged thereon as viewed from the side of the element surface, while FIG. 5B is a diagram illustrating the board 500 as viewed from the side of the sensor surface. The driver 33 includes the first inverter circuit 331 and the second inverter circuit 332.

In FIGS. 5A and 5B, the switching elements 331A, the switching elements 331B, the first temperature sensors 34, and the second temperature sensing portion 35 are depicted for the sake of simplicity in description. As illustrated in FIG. 5B, each first temperature sensing portion 34 is arranged at a position that corresponds to both the center of the corresponding inverter circuit and the center of the region in which the MOSFETs are arranged, while the second temperature sensing portion 35 is arranged at a position equidistant from the first temperature sensors 34. The arrangement thereof in the above positional relationship helps to reduce the difference in the calculated amount of heat radiation between the plurality of inverter circuits, and leads to stable calculation of the amounts of heat radiation.

Figure 6:
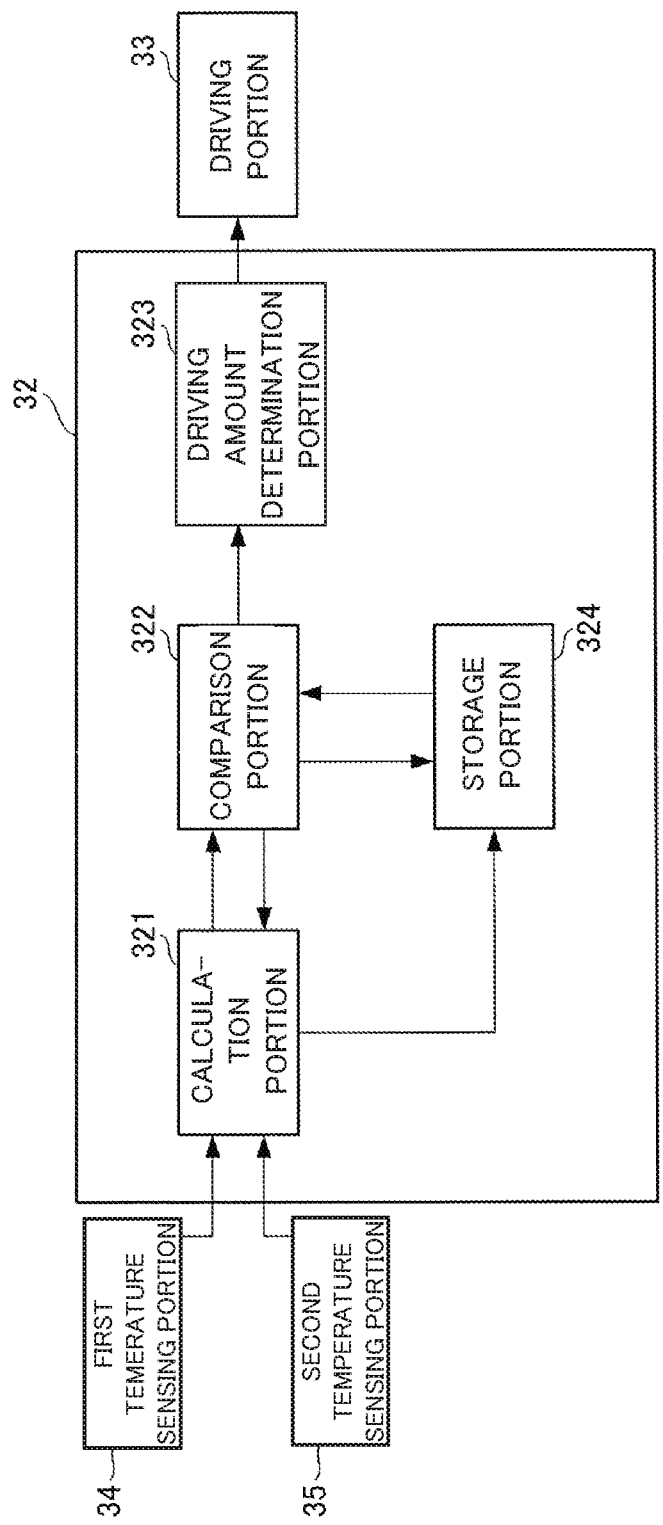
FIG. 6 is a block diagram illustrating various functions of a controller according to an example embodiment of the present disclosure.

FIG. 6 is a block diagram illustrating various functions of the controller 32. The controller 32 includes a calculation portion 321, a comparison portion 322, a driving amount determination portion 323, and a storage portion 324. Of the two inverter circuits in the present example embodiment, the inverter circuit having a higher temperature is referred to as one of the inverter circuits, while the inverter circuit having a lower temperature is referred to as a remaining one of the inverter circuits. In the case where the driver 33 includes more than two inverter circuits, the inverter circuit having the highest temperature is referred to as one of the inverter circuits, while an inverter circuit having a temperature lower than that of the one of the inverter circuits is referred to as a remaining one of the inverter circuits.

The calculation portion 321 calculates a first temperature difference, which is the temperature of the one of the inverter circuits minus the temperature of the remaining one of the inverter circuits measured by the first temperature sensors 34, at a specific time point. The calculation portion 321 outputs the calculated first temperature difference to the comparison portion 322.

The specific time point is a time point at which at least one of the temperatures of the two inverter circuits measured by the first temperature sensors 34 becomes equal to or higher than a predetermined temperature. The specific time point is identified by the comparison portion 322, and is outputted to the driving amount determination portion 323. The predetermined temperature is determined based on temperature characteristics of the elements of the inverter circuits, and, for example, is determined based on temperature characteristics of the MOSFETs used as the switching elements, that is, based on temperatures that allow the MOSFETs to operate with safety. Note that the specific time point may be determined in advance based on the driving amount of the motor 20 and/or the like, instead of being determined based on the temperatures measured by the first temperature sensors 34. In this case, information concerning the specific time point is stored in the storage portion 324, and the calculation portion 321 obtains the information concerning the specific time point from the storage portion 324. The specific time point used in the following description has the same meaning as the specific time point described here.

An improvement in the accuracy with which an inverter circuit excessively heated is identified can be achieved by performing control to prevent overheating of the inverter circuits at the specific time point determined in the above-described manner.

In addition, the calculation portion 321 calculates a second temperature difference, which is the temperature of the remaining one of the inverter circuits measured by the corresponding first temperature sensing portion 34 minus the temperature of the controller 32 measured by the second temperature sensing portion 35, at the specific time point. The calculation portion 321 outputs the calculated second temperature difference to the comparison portion 322.

If any first temperature sensing portion 34 is malfunctioning, a temperature lower than an actual temperature can be measured thereby. If this happens, the first temperature difference, which is used to identify an inverter circuit excessively heated, may become greater than an actual temperature difference, which may cause an inverter circuit not being excessively heated to be identified as an inverter circuit excessively heated.

In the case where the motor 20 is driven by the two inverter circuits, each of the temperatures of the respective inverter circuits becomes higher than the temperature of the controller 32. Accordingly, influence of the malfunctioning of any first temperature sensing portion 34 could be limited by performing control to protect the inverter circuits when a value obtained by subtracting the temperature of the controller 32 from the lower one of the measured temperatures of the inverter circuits is equal to or greater than a predetermined value that is at least equal to or greater than zero.

Note that a value obtained by subtracting an ambient temperature of the control unit measured in advance from the temperature of the remaining one of the inverter circuits may alternatively be calculated as the second temperature difference without use of the second temperature sensing portion 35. It may be determined which of the temperature measured by the second temperature sensing portion 35 and the ambient temperature is to be used for calculating the second temperature difference, depending on the amount of change in the ambient temperature of the control unit. For example, in the case where the amount of change in the ambient temperature is large, such as when the motor driving apparatus 30 is used in an environment that experiences considerable changes in temperature, using the value actually measured by the second temperature sensing portion 35 for calculating the second temperature difference may provide an improvement in the accuracy with which an inverter circuit excessively heated is identified. Alternatively, the calculation portion 321 may be configured to be capable of selecting one of the temperature measured by the second temperature sensing portion 35 and the ambient temperature measured in advance.

The comparison portion 322 compares the first temperature difference obtained by the calculation portion 321 with a first difference value, and determines whether or not the first temperature difference is equal to or greater than the first difference value. The first difference value will be hereinafter referred to as a predetermined difference value. The comparison portion 322 outputs the determination result to the driving amount determination portion 323. The predetermined difference value is determined based on the elements of the inverter circuits, and, for example, is determined based on the temperatures that allow the MOSFETs used as the switching elements to operate with safety. The predetermined difference value is stored in the storage portion 324, and the comparison portion 322 obtains the predetermined difference value from the storage portion 324.

The comparison portion 322 compares the second temperature difference obtained by the calculation portion 321 with a second difference value, and determines whether or not the second temperature difference is equal to or greater than the second difference value. The comparison portion 322 outputs the determination result to the driving amount determination portion 323. The second difference value is at least 0° C. or higher. The second difference value is stored in the storage portion 324, and the comparison portion 322 obtains the second difference value from the storage portion 324.

The comparison portion 322 compares each of the temperatures of the plurality of inverter circuits measured by the first temperature sensors 34 with the predetermined temperature, and identifies a time point at which at least one of the temperatures of the inverter circuits becomes equal to or higher than the predetermined temperature. The comparison portion 322 outputs the identified time point to the calculation portion 321. The predetermined temperature is determined based on the temperatures that allow the MOSFETs of the inverter circuits to operate with safety, as described above. The predetermined temperature is stored in the storage portion 324, and the comparison portion 322 obtains the predetermined temperature from the storage portion 324.

The driving amount determination portion 323 determines the driving amount of the motor 20 based on the determination result(s) outputted from the comparison portion 322. The case where the driving amount is determined based on the first temperature difference will first be described below. When the first temperature difference is equal to or greater than the predetermined difference value, the driving amount determination portion 323 outputs a driving signal indicating a second driving amount smaller than a first driving amount, which is the driving amount at the specific time point, to the inverter circuit of the driver 33.

An inverter circuit having a high temperature can be identified based on the difference in temperature between the inverter circuits, and the amount of electric current to be supplied to the motor 20 by the identified inverter circuit having a high temperature can be reduced to prevent a malfunction of the inverter circuit.

Next, the case where the second temperature difference, in addition to the first temperature difference, is taken into account to determine the driving amount will now be described below. The driving amount determination portion 323 may output the driving signal indicating the second driving amount smaller than the first driving amount to the inverter circuit of the driver 33 when the first temperature difference is equal to or greater than the predetermined difference value, and, in addition, the second temperature difference is equal to or greater than the second difference value.

Even when any of the first temperature sensors 34 is malfunctioning, an inverter circuit having a high temperature can be identified to prevent a malfunction of the inverter circuit.

As described above, the storage portion 324 may store the predetermined difference value, the second difference value, the predetermined temperature, and the specific time point. The information stored therein may be referred to by the comparison portion 322 or the calculation portion 321.

As described above, the present example embodiment is able to provide a motor driving apparatus that is advantageous in reliability of control for preventing overheating of each of a plurality of inverter circuits. In addition, an electric power steering apparatus having the motor driving apparatus according to the present example embodiment adopted therein may be advantageous in operating comfort.

A first modification of the present example embodiment will now be described below.

In the case where an inverter circuit having a high temperature is identified based on only the difference in temperature between the inverter circuits as described above, an inverter circuit that does not need to be reduced in load may be identified as an inverter circuit excessively heated. This is because a large difference in temperature therebetween may be caused not by an excessive heating but by a malfunction of a temperature sensing portion. The present modification is able to provide an improvement in the accuracy with which an inverter circuit excessively heated is identified.

The calculation portion 321 calculates a rate of increase of the temperature of each inverter circuit at a predetermined interval, and outputs the calculated rate of increase to the comparison portion 322. The comparison portion 322 compares the rate of increase calculated by the calculation portion 321 with a predetermined threshold value stored in the storage portion 324, and determines whether or not the rate of increase is equal to or greater than the predetermined threshold value. The comparison portion 322 outputs the determination result to the driving amount determination portion 323.

The driving amount determination portion 323 determines the driving amount of the motor 20 based on the determination result outputted from the comparison portion 322. When the rate of increase is equal to or greater than the predetermined threshold value, the driving amount determination portion 323 outputs the driving signal indicating the second driving amount smaller than the first driving amount, i.e., the driving amount at the specific time point, to the one of the inverter circuits of the driver 33.

The predetermined interval may be determined, for example, based on the driving amount of the motor 20. A large driving amount involves a high electric current passing through the inverter circuit, resulting in a high rate of increase in the temperature thereof, which may cause the MOSFETs of the inverter circuit to overheat in a short time and to malfunction. Accordingly, a time interval that does not allow the temperature of each MOSFET to be increased up to a temperature that may cause a malfunction of the MOSFET is set as the predetermined interval.

The predetermined threshold value is determined based on the temperature characteristics of the elements of each inverter circuit. The temperature characteristics include, for example, the rates of increase in the temperature of the inverter circuit which are expected for driving amounts of the motor 20, and the temperatures that allow the MOSFETs used as the switching elements of the inverter circuit to operate with safety. An excessive limitation on driving can be prevented by taking into account the rate of increase in temperature that is expected when the motor 20 is driven by an inverter circuit properly functioning to determine the predetermined threshold value.

A second modification of the present example embodiment will now be described below.

Even if an inverter circuit having a high temperature is identified at some time point, the temperature thereof may thereafter decrease to eliminate the need to reduce a load thereon. The present modification is able to provide an improvement in the accuracy with which an inverter circuit excessively heated is identified by additionally taking into account a period during which the inverter circuit has a high temperature.

First, the calculation of the first temperature difference by the calculation portion 321 and the comparison of the first temperature difference with the predetermined difference value by the comparison portion 322 are continuously performed for a predetermined period from the specific time point. Next, the comparison portion 322 determines whether or not the first temperature difference continues to be equal to or greater than the predetermined difference value for the predetermined period from the specific time point. The comparison portion 322 outputs the determination result to the driving amount determination portion 323. The predetermined period may be determined based on temperature load characteristics related to temperature loads that allow the MOSFETs to operate with safety. The predetermined period may be stored in the storage portion 324.

The driving amount determination portion 323 determines the driving amount of the motor 20 based on the determination result outputted from the comparison portion 322. The driving amount determination portion 323 outputs the driving signal indicating the second driving amount to the inverter circuit of the driver 33 when the first temperature difference continues to be equal to or greater than the predetermined difference value for the predetermined period from the specific time point.

A third modification of the present example embodiment will now be described below.

In connection with the second modification, a reduction in the load may sometimes be required even when the first temperature difference does not continue to be equal to or greater than the predetermined difference value for the whole predetermined period from the specific time point. Specifically, during the predetermined period, the MOSFETs may sometimes be in a high-temperature condition, involving a risk of malfunction, and sometimes be in a safe temperature condition, involving no risk of malfunction, and a total time for which the first temperature difference is equal to or greater than the predetermined difference value during the predetermined period may be equal to or longer than a predetermined time, causing a risk of malfunction of the MOSFETs.

The present modification is able to provide an improvement in the accuracy with which an inverter circuit excessively heated is identified by taking into account whether or not the total time for which a high-temperature condition is observed during the predetermined period is equal to or longer than the predetermined time.

The calculation of the first temperature difference by the calculation portion 321 and the comparison of the first temperature difference with the predetermined difference value by the comparison portion 322 are continuously performed for the predetermined period from the specific time point, and the comparison portion 322 determines the total time for which the first temperature difference is equal to or greater than the predetermined difference value during the predetermined period from the specific time point. The comparison portion 322 outputs the determination result to the driving amount determination portion 323. The predetermined period may be determined based on the temperature load characteristics related to the temperature loads that allow the MOSFETs to operate with safety. The predetermined period may be stored in the storage portion 324.

The driving amount determination portion 323 determines the driving amount of the motor 20 based on the determination result outputted from the comparison portion 322. The driving amount determination portion 323 outputs the driving signal indicating the second driving amount to the one of the inverter circuits of the driver 33, when the total time for which the first temperature difference is equal to or greater than the predetermined difference value during the predetermined period from the specific time point is equal or longer than the predetermined time.

Note that, although a three-phase motor is used as the motor 20 in each of the above-described example embodiment and the above-described modifications thereof, motors having one phase, two phases, or more than three phases may alternatively be used. Also note that the above-described motor driving apparatus 30 may be applied to apparatuses other than power steering apparatuses. For example, the above-described motor driving apparatus 30 may be used to drive a motor used in another portion of the transportation equipment, such as, for example, an automobile. Also note that the above-described motor driving apparatus 30 may be used to drive a motor installed in a device other than an automobile, such as, for example, an industrial robot.

While example embodiments of the present disclosure have been described above, it will be understood that the present disclosure is not limited to the above-described example embodiments, and that the above-described example embodiments may be modified or changed in various manners without departing from the scope and spirit of the present disclosure.

The present application claims priority based on Japanese Patent Application No. 2017-89634 filed on Apr. 28, 2017, the entire content of which is incorporated herein by reference.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor driving apparatus that drives a motor, the motor driving apparatus comprising:
a controller that outputs a driving voltage signal indicating a driving amount of the motor in accordance with a pulse width modulation scheme;
a driver including a plurality of inverter circuits, each of which supplies an electric current supplied from an external power supply to the motor based on the driving signal outputted from the controller;
first temperature sensors, each of which measures a temperature of a separate one of the plurality of inverter circuits; and
a second temperature sensor that measures a temperature of the controller; wherein
a first temperature difference is defined as the temperature of one of the inverter circuits minus the temperature of a remaining one of the inverter circuits;
the controller, when the first temperature difference is equal to or greater than a predetermined difference value at a specific time point, outputs a driving signal indicating a second driving amount smaller than a first driving amount to the one of the inverter circuits, the first driving amount being a driving amount at the specific time point;
a second temperature difference is defined as the temperature of the remaining one of the inverter circuits measured by the corresponding first temperature sensor minus the temperature of the controller measured by the second temperature sensor; and
the controller, when the second temperature difference is equal to or greater than zero at the specific time point, outputs the driving signal indicating the second driving amount to the one of the inverter circuits.

2. The motor driving apparatus according to claim 1, wherein the second temperature sensor includes a thermistor that changes in resistance value in accordance with the temperature to be measured.

3. The motor driving apparatus according to claim 1, wherein the specific time point is a time point at which at least one of the temperatures of the plurality of inverter circuits measured by the first temperature sensor becomes equal to or higher than a predetermined temperature.

4. The motor driving apparatus according to claim 1, wherein, on a board on which the driver is located, the plurality of inverter circuits are arranged to have point symmetry with respect to a center of a surface of the board on which the driver is located.

5. The motor driving apparatus according to claim 1, wherein the predetermined difference value is determined based on temperature characteristics of elements of the inverter circuits.

6. The motor driving apparatus according to claim 1, wherein the controller and the driver are located on separate boards.

7. The motor driving apparatus according to claim 1, wherein each of the first temperature sensors is a thermistor that changes in resistance value in accordance with the temperature to be measured.

8. An electric power steering apparatus comprising a motor driven by the motor driving apparatus of claim 1.

9. The motor driving apparatus according to claim 3, wherein the predetermined temperature is determined based on temperature characteristics of elements of the inverter circuits.

10. A motor driving apparatus that drives a motor, the motor driving apparatus comprising:
a controller that outputs a driving voltage signal indicating a driving amount of the motor in accordance with a pulse width modulation scheme;
a driver including a plurality of inverter circuits, each of which supplies an electric current supplied from an external power supply to the motor based on the driving signal outputted from the controller; and
first temperature sensors, each of which measures a temperature of a separate one of the plurality of inverter circuits; wherein
a first temperature difference is defined as the temperature of one of the inverter circuit minus the temperature of a remaining one of the inverter circuits;
the controller, when the f first temperature difference is equal to or greater than a predetermined difference value at a specific time point, outputs a driving signal indicating a second driving amount smaller than a first driving amount to the one of the inverter circuits, the first driving amount being a driving amount at the specific time point; and
the controller calculates a rate of increase of the temperature of each of the plurality of inverter circuits measured by the corresponding first temperature sensor at a predetermined interval, and outputs the driving signal indicating the second driving amount to the one of the inverter circuits when the rate of increase of the one of the inverter circuits is equal to or greater than a predetermined threshold value.

11. The motor driving apparatus according to claim 10, wherein the predetermined threshold value is determined based on temperature characteristics of elements of the inverter circuits.

12. A motor driving apparatus that drives a motor, the motor driving apparatus comprising:
a controller that outputs a driving voltage signal indicating a driving amount of the motor in accordance with a pulse width modulation scheme;
a driver including a plurality of inverter circuits, each of which supplies an electric current supplied from an external power supply to the motor based on the driving signal outputted from the controller; and
first temperature sensors, each of which measures a temperature of a separate one of the plurality of inverter circuits; wherein a first temperature difference is defined as the temperature of one of the inverter circuits minus the temperature of a remaining one of the inverter circuits;

the controller, when the first temperature difference is equal to or greater than a redetermined difference value at a specific time point, outputs a driving signal indicating a second driving amount smaller than a first driving amount to the one of the inverter circuits the first driving amount being a driving amount at the specific time point; and the controller outputs the driving signal indicating the second driving amount to the one of the inverter circuits when the first temperature difference continues to be equal to or greater than the predetermined difference value for a predetermined period from the specific time point.

13. A motor driving apparatus that drives a motor, the motor driving apparatus comprising:

a controller that outputs a driving voltage signal indicating a driving amount of the motor in accordance with a puke width modulation scheme;

a driver including a plurality of inverter circuits, each of which supplies an electric current supplied from an external power supply to the motor based on the driving signal outputted from the controller; and first temperature sensors, each of which measures a temperature of a separate one of the plurality of inverter circuits; wherein a first temperature difference is defined as the temperature of one of inverter circuits minus the temperature of a remaining one of the inverter circuits;

the controller, when the first temperature difference is equal to or greater than a predetermined difference value at a specific time point, outputs a driving signal including a second driving amount smaller than a first driving amount to the one of the inverter circuits, the first driving amount being a driving, amount at the specific time point; and the controller outputs the driving signal indicating the second driving amount to the one of the inverter circuits when a total time for which the first temperature difference is equal to or greater than the predetermined difference value during a predetermined period from the specific time point is equal to or longer than a predetermined time.

* * * * *